(12) United States Patent
Adachi et al.

(10) Patent No.: US 7,114,933 B2
(45) Date of Patent: Oct. 3, 2006

(54) ELECTRICALLY DRIVEN POTTER'S WHEEL

(75) Inventors: Nobumasa Adachi, Neyagawa (JP); Yoshiharu Matsumura, Kyoto (JP); Harumichi Nakamura, Inagawa-cho (JP); Shoshi Takashita, Nagaokakyo (JP); Masahiro Akamatsu, Nagaokakyo (JP)

(73) Assignee: Nihon Densan Shimpo Kambushiki Kaisha, (JP)

( * ) Notice: Subject to any disclaimer, the term of this patent is extended or adjusted under 35 U.S.C. 154(b) by 194 days.

(21) Appl. No.: 10/392,640

(22) Filed: Mar. 19, 2003

(65) Prior Publication Data

US 2004/0033284 A1    Feb. 19, 2004

(30) Foreign Application Priority Data

Aug. 19, 2002  (JP) .............................. 2002-238671
Oct. 31, 2002  (JP) .............................. 2002-318537

(51) Int. Cl.
  *B28B 1/02*  (2006.01)
(52) U.S. Cl. ..................... 425/3; 425/162; 425/169; 425/263; 425/459
(58) Field of Classification Search .................... 425/3, 425/135, DIG. 33, 162, 169, 263, 459
See application file for complete search history.

(56) References Cited

U.S. PATENT DOCUMENTS 3,894,830 A    7/1975   Edwards
3,995,983 A *  12/1976  Shenker .................... 425/263
4,332,542 A    6/1982   Matsui
4,645,991 A *  2/1987   Ban et al. .................. 388/822
4,687,961 A *  8/1987   Horber ...................... 310/186
4,702,920 A    10/1987  Goodman
5,230,909 A    7/1993   Stanly
6,138,527 A *  10/2000  Bitterly et al. ............ 156/169

FOREIGN PATENT DOCUMENTS

JP    10-161752     6/1998
JP    11-178379     7/1999
JP    11-207713     8/1999
JP    2001-334512   12/2001

* cited by examiner

Primary Examiner—Yogendra Gupta
Assistant Examiner—Thu Khanh T. Nguyen
(74) Attorney, Agent, or Firm—Gerald E. Hespos; Anthony J. Casella (57) ABSTRACT

A potter's wheel for working clay and other pottery material on a turntable driven by a DC brushless motor. In order that driving speed is not affected by the load due to user's access to the work of clay, the speed of the motor detected by a speed detector is fed back to a speed control signal generator and a motor driving control signal is generated as a function of the difference between the detected motor speed and a directed speed inputted through a speed setter in response to the operation to a manipulation member. Then, a motor control generates such a motor driving signal as to make the motor driving control signal zero, with the motor driving signal being fed to the motor, thereby controlling the rotational speed of the turntable to be a directed value regardless of the load applied to the turntable via the work.

15 Claims, 7 Drawing Sheets

ELECTRICALLY DRIVEN POTTER'S WHEEL

BACKGROUND OF THE INVENTION

1. Field of the Invention

The present invention relates to a potter's wheel for working clay and other pottery material on a turntable to make pots, bowls, plates, cups and the like, and more particularly pertains to such a potter's wheel driven by a DC brushless motor.

2. Description of the Related Art

In the field of pottery, many people use an electrically driven potter's wheel of which turntable is driven by an electric motor. Such an electrically driven potter's wheel is provided with the turntable for supporting a work of wet clay and other material, an electric motor for driving the turntable, a pedal for adjustment of the motor speed, and a speed control for controlling the rotational speed of the motor as a function of amount of operation to the pedal, i.e. how much the pedal is depressed by a foot of a user or operator. Although pottery material other than clay can be used for the pottery, explanation will be made hereinafter with reference to clay as a representative of the material for the pottery. However, it is to be noted that the present invention is also applicable to other pottery material than clay.

Upon throwing pottery, a user deposits a mass of wet clay on the turntable and hand-shape the wet clay to a desired form while turning the turntable. During that throwing process, a force is imparted to the wet clay as the user accesses the clay, and the force acts as a load to the electric motor to vary the rotational speed of the motor. Such variation of motor speed is not preferable for the formation of the pottery. In order to maintain the motor speed constant, the user has to delicately adjust the amount of operation of the pedal and such adjustment requires expertise.

Further, a conventional potter's wheel of the type driven by a DC brushless motor is constructed to detect the change or switching of magnetic pole of the rotor magnet, by means of a Hall sensor and determine the timing for switching the direction of the electric current running through coils of a stator of the DC brushless motor. However, such a construction has a limit in rotating the turntable smoothly. Especially, when the speed of the rotor of the motor is in a low range, a lug or discordance occurs in synchronization between the switching of the direction of the electric current and rotation of the motor, causing step-out and stopping the motor instantaneously. The unexpected stop of the motor during the throwing of the pottery will result in destroy of the work which has been shaped.

SUMMARY OF THE INVENTION

Accordingly, an object of the present invention is to provide an electrically driven potter's wheel which operates smoothly and stably.

Another object of the present invention is to provide an electrically driven potter's wheel of which driving speed is not affected by the load due to user's access to the work of clay.

Still another object of the present invention is to provide an electrically driven potter's wheel having a countermeasure for the operation of the driving mechanism when the load to the driving mechanism exceeds an allowable limit.

To attain one or more of the above mentioned objects, a potter's wheel according to the present invention comprises a turntable for supporting a work to be shaped, an electric motor for driving the turntable, a manipulation member to be operated by a user, a speed setter for generating a directed speed signal representative of a speed of the electric motor as a function of the amount of the operation to the manipulation member, a speed detector for detecting the rotational speed of the motor, a speed control signal generator for generating a speed control signal as a function of the difference between the directed speed signal and the detected speed signal, a motor control for generating a motor driving control signal for making the speed control signal to zero and a motor driver for feeding, to the electric motor, a motor driving signal controlled by the speed control signal.

With the arrangement of the present invention as described above, the speed of the motor detected by the speed detector is fed back to the speed control signal generator and the motor driving control signal is generated as a function of the difference between the detected motor speed and a directed speed inputted through the speed setter in response to the operation to the manipulation member. Then, the motor control generates such a motor driving signal as to make the motor driving control signal zero, with the motor driving signal being fed to the motor, thereby controlling the rotational speed of the turntable to be of a directed value regardless of the load applied to the turntable via the work.

According to an embodiment of the present invention, the electric motor is a DC brushless motor including a stator and a multi-pole rotor magnet which opposes the stator. The potter's wheel of the embodiment is provided with a position detector which detects the rotational position of the rotor or rotor magnet relative to the stator with a higher resolution than the pitch of the poles of the rotor magnet. The motor control has a memory for storing sinusoidal wave level signals associated with the rotational position of the rotor magnet within a pitch of the magnetic poles of the rotor magnet, and produces a motor driving signal from the speed control signal and a level signal which is read out from the memory as a function of the position detected by the position detector and inputted to the motor control.

According to this embodiment, the position detector detects the rotational position of the rotor relative to the stator with a resolution higher than the pitch of the poles of the rotor magnet, and a level signal corresponding to the detected position is read out from the memory. Then, the motor control produces a sinusoidal or sin wave motor driving signal in accordance with the level signal and directed speed value. The motor driving signal is fed to the motor to drive the motor. Thus, the motor is driven by a sinusoidal or sin wave signal and the turntable is rotated smoothly. In addition, as the rotational position of the rotor relative to the stator is detected with a resolution higher than the pitch of the poles of the rotor magnet, the controlled speed is highly responsive to the operation of the speed setting or speed direction.

According to another aspect of the embodiment of the present invention, the electric motor is an inner rotor type motor wherein the rotor is located inside of the stator. With the employment of the inner rotor type motor, the $GD^2$ value which represents an inertia characteristics of the motor, will be small and the response of the motor to the direction or setting of the motor speed will be improved to enable the operator to form the work with a thickness and shape as he/she likes.

According to still another aspect of the present invention, the speed control signal generator may apply either one or both of proportion control and integration control to the difference between the directed speed and the detected speed. In this case, the speed control signal is produced by applying at least either one of the proportion control and integration control to the signal representative of the difference between the directed speed and the detected speed. Consequently, the gain or control factor of the speed control signal is increased and the rotational speed of the motor may coincide with the directed speed.

According to yet another aspect of the present invention, non-linear characteristics may be provided in the relationship between the amount of operation for the speed setting or direction, and the directed speed signal. For example, the directed speed signal may change exponentially in response to the amount of the operation to the speed setting or direction member. Another example of the characteristics may be that the rotational speed increases gradually along a gentle curve in a low speed region, the speed changing curve is substantially flat in the middle speed region and the speed increase substantially linearly in a high speed region. Such provision of the special characteristics will match the speed control of the turntable to the feeling of the operator. If a plurality of the characteristics are provided in the potter's wheel to be selected by the operator, he or she may choose the characteristics optionally in accordance with his or her taste.

The speed control signal generator may include a PLL (Phase Lock Loop) circuit which generates the speed control signal by comparing the phases of the detected speed signal and the directed speed signal. The PLL circuit will improve the stability of rotational speed of the turntable, thereby facilitating the production of a large plate that requires stability of rotational speed.

According to further aspect of the present invention, the motor control may include a driving circuit for generating a motor driving current, a current detector for detecting the electric current fed to the motor, an upper limit current memory for storing an upper limit value of the motor driving current, a current comparator for comparing the current detected by the current detector with the current value stored in the upper limit current memory, and a feedback loop for feeding back the output of the current comparator to the driving circuit to control the motor driving current.

According to yet further aspect of the embodiment, the motor control may include a driving circuit for generating a motor driving current, a pulse signal generator for generating pulse signals for driving the motor, an pulse controller for controlling width of the pulse signals, an upper limit current memory for storing an upper limit value of the motor driving current, a controller for controlling the driving circuit in accordance with the comparison of the current detected by the current detector with the current value stored in the upper limit current memory, and a limiter provided between the pulse signal generator and the pulse controller to detect if the voltage of the output of the pulse generator is higher or not higher than a predetermined value, the limiter allowing the output of the pulse signal generator to be as it is when the voltage is not higher than the predetermined value, while the limiter outputting a voltage signal of the predetermined value when the voltage is higher than the predetermined value. With such arrangement, especially provision of the limiter, the motor driving circuit may be cheap in cost, and the motor will be decelerated before the motor is made unstable in rotational speed and makes abnormal noise due to over-load to the motor. The operator may notice the over-load by the deceleration of the motor speed.

Still further, a mechanical or electrical amplifier may be provided between the manipulation member and the speed setter to amplify the output of the speed setting responsive to the amount of the operation to the manipulation member so that the rotational speed of the turntable will response to the operation to the manipulation member sensitively so that operativity or operational property of the potter's wheel will be improved. The amplifier may be a mechanical one such as a gear mechanism or a friction roller mechanism, or an electrical one such as an electric amplifier.

The above and further objects and novel feature of the present invention will more fully appear from the following detailed description when the same is read in connection with the accompanying drawing. It is to be expressly understood, however, that the drawings are for purposed of illustration only and is not intended as definition of the limits of the invention.

DETAILED DESCRIPTION OF PREFERRED EMBODIMENTS

Figure 1:
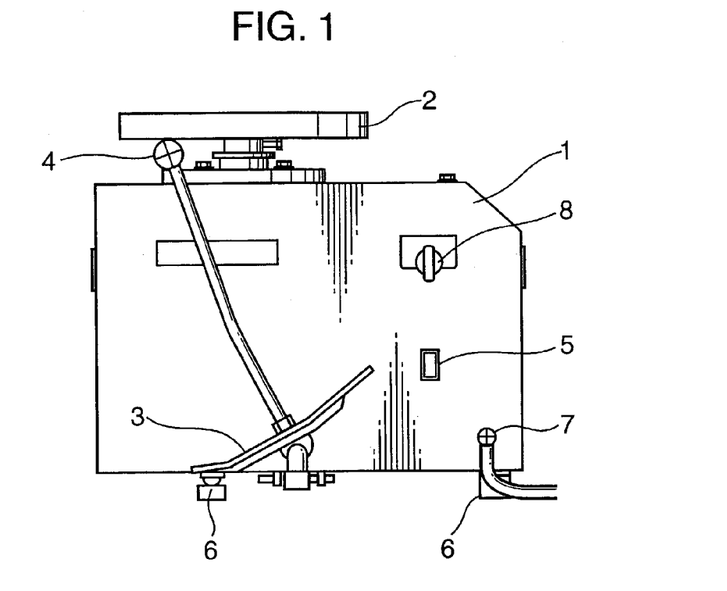
FIG. 1 is a schematic illustration of an outer appearance of a potter's wheel in accordance with an embodiment of the present invention.

With reference to FIG. 1, a potter's wheel according to an embodiment of the present invention is provided with a housing 1 and a turntable 2 centrally mounted on the housing 1 to rotate about a central vertical axis. The housing 1 is provided with a pedal 3 pivotally mounted on a sidewall of the housing 1 at a lower portion thereof to be depressed by an operator's foot and turn in response the depression. A power switch 5 is provided at an appropriate portion on the sidewall of the housing 1 as shown in the Figure. Adjustable feet 6 are provided on the bottom of the housing 1 to support the housing 1. The height of each foot 6 is adjustable in a conventional manner to stabilize the housing 1 on a ground or floor. A switch 8 located above the power switch 5 is for switching the rotational direction of the turntable 2. A power supply code or cable 7 is derived out of the housing 1 beneath the power switch 5.

The pedal 3 has a shape to receive a user's or operator's foot and is supported on the housing 1 by a horizontally extending shaft (not shown) which is corotatable with the pedal 3. The horizontally extending shaft is interconnected with a potentiometer by way of a gear mechanism such that the movement of the pedal is amplified during the transmission by the gear mechanism and that the potentiometer produces a voltage signal corresponding to the amplified movement. With this arrangement, the output voltage changes largely in response to the depressing operation to the pedal 3, thereby enabling delicate control of the rotational speed of the turntable 2. A lever 4 is integrally connected with the pedal 3 or the horizontally extending shaft to be manipulated by hand to cause the same effect as that done by the pedal.

Figure 2:
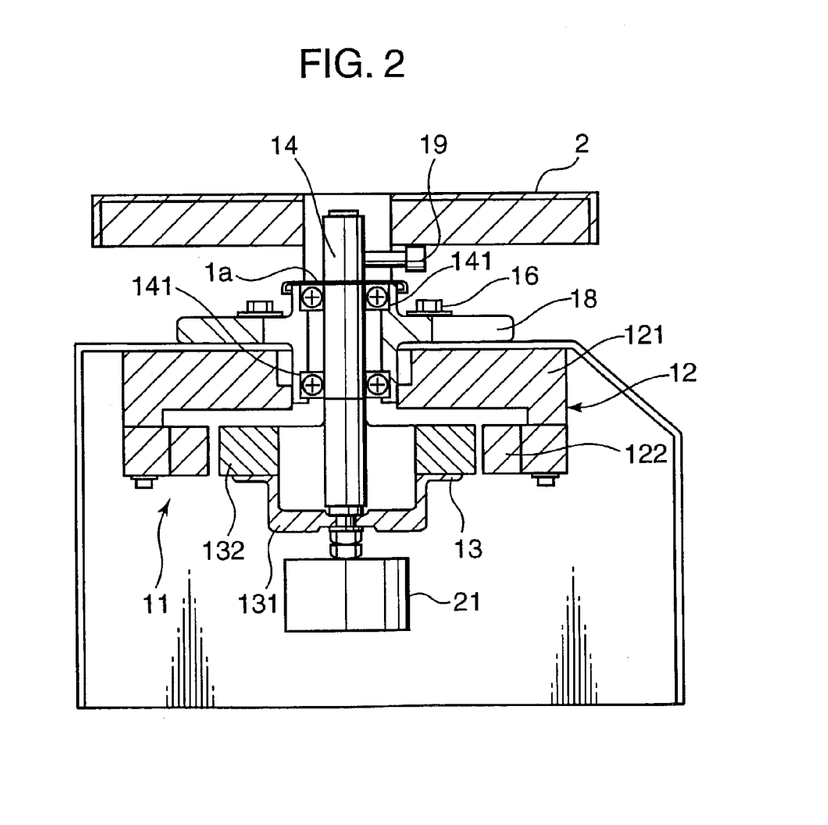
FIG. 2 is a partial cross-sectional view of the potter's wheel shown in FIG. 1.

FIG. 2 is a side cross sectional view of the driving mechanism of the potter's wheel shown in FIG. 1. As seen in FIG. 2, an electric motor 11 is mounted within the housing 1 in an upright posture. The motor 11 is an inner rotor type DC brushless motor composed of a stator 12 and a rotor 13 disposed inside of the stator. The stator includes an inverted cup shaped stator hub 121 and coils 122 of three phases U, V and W mounted inside of the stator hub 121. The stator 12 has twenty-four poles. The rotor 131 comprises a cup-shaped rotor hub 131 and a rotor magnet 132 composed of a plurality of magnet pieces mounted on the flange portion of the rotor hub 131 with the plurality of N and S pole magnet pieces being arranged alternately side-by-side opposing the coils 122. The number of the magnet pieces is twenty in the present embodiment, i.e. the number of the N pole magnet pieces is ten and the number of the S pole magnets pieces is ten. The housing 1 is formed with a through hole 1a where a pair of ball bearings 141 are installed. The ball bearings 141 support a motor shaft 14 which vertically extends and is exposed above the housing 1. The turntable 2 is co-rotatably attached to the top of the motor shaft 14.

A holder 18 is fixed on the upper surface of the housing 1 by a pair of bolts 16 with the motor shaft 14 extending through the holder 18. The turntable 2 is fixed to the top portion of the shaft 14 by a bolt 19 and is positioned above the holder 18. A rotary encoder 21 is located at the bottom end portion of the shaft 14 to detect the rotational position of the rotor 13 which rotates integrally with the shaft 14. The rotary encoder 21 may be either mechanical or optical or other type and may be located at other position, for example, at the middle portion of the shaft, so far as the encoder is associated with the shaft 14 or rotor 13 to detect its rotational position.

The rotary encoder is arranged to generate pulse signals for the detection of the rotational position of the rotor 13 with resolution or resolving power greater than that detected by a position sensor of a position detecting section 60 (see FIG. 3) which detects the change or switching of the magnetic poles of the rotor magnet 132. In the present embodiment, the rotary encoder 21 generates 100 pulses during rotational or angular movement of rotor for a single pole, i.e. for one pitch of the magnetic poles.

With the electrically driven potter's wheel constructed as described above, when the coil 122 is energized, magnetic field is generated in the coils 122 of the stator 12 and rotates the rotor 13 and the shaft 14 by the interaction of the generated magnetic field and the magnetic power of the rotor magnet 132, thereby rotating the turntable 2 connected to the shaft 14.

Figure 6A:
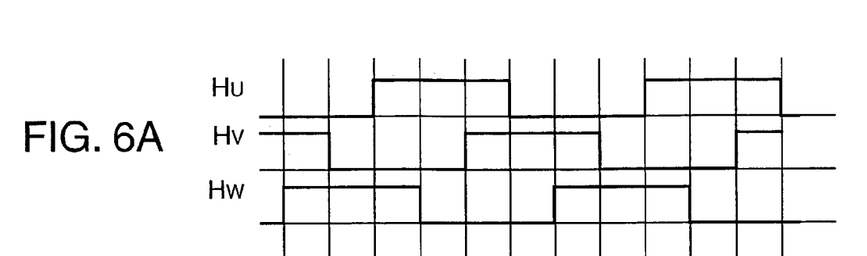
FIGS. 6A and 6B are timing charts for the explanation of the operation of the potter's wheel according to the embodiment.

Three Hall sensors 40 (see FIG. 3) are disposed on the stator 12 at interval of 30 degrees to oppose the rotor magnet 132. The Hall sensors 40 detect the change or switching of the poles of the rotor magnet 132 and detect the position of the rotor magnet 132 relative to the stator 12. As described above, the number of the rotor magnet pieces, i.e. the number of the poles of the rotor magnet 132 is twenty. Accordingly, the pole of the magnet switches every 18 degrees. In other words, in the present invention, 36 degrees of mechanical angle corresponds to 360 degrees of electrical angle. Thus, the Hall sensors 40 should be located at the interval of 12 degrees in mechanical angles, i.e. 120 degrees of electrical angle. However, in the present invention, the Hall sensors 40 are shifted by 18 degrees and arranged at interval of 30 degrees. This is because the sizes of the Hall sensors 40 are so large that it is difficult to arrange three Hall sensors 40 within the angle of 36 degrees. Thus, the location of the Hall sensors 40 are shifted by 180 degrees by electrical angle, bringing about the same effect. With the arrangement of the rotor magnet pieces and Hall sensors 40 as described above, the Hall sensors 40 respectively generate signals HU, HV and HW as shown in FIG. 6A.

Figure 3:
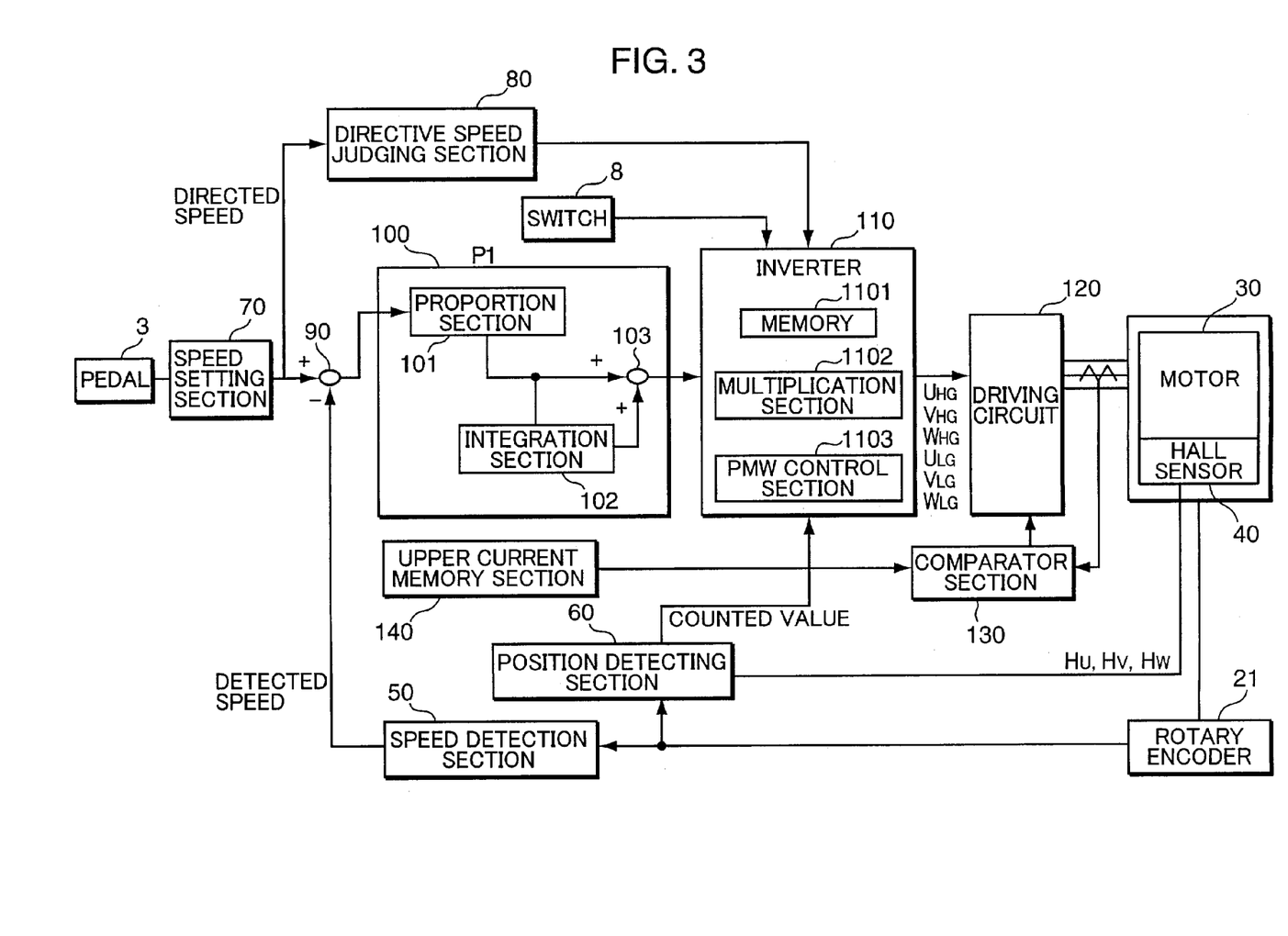
FIG. 3 is a block diagram showing the control system for controlling the potter's wheel shown in FIGS. 1 and 2.

FIG. 3 is a block diagram showing a control system for controlling the rotational operation of the potter's wheel shown in FIGS. 1 and 2. The control system includes a CPU, a ROM and a RAM, and the CPU controls and executes the process of each functional section.

A speed detection or detecting section 50 detects edges of pulse signals outputted from the rotary encoder 21 and calculate the rotational speed of the motor 30. A position detecting section 60 is provided with a counter and the like and determines the angular position of the rotor 13 as a function of the pulse signals outputted from the Hall sensor 40 and the pulse signals outputted from the rotary encoder 21. In more detail, the position detecting section 60 resets a counter upon detection of first occurrence of any raising or falling edge of a pulse signal outputted from any one of the Hall sensors 40, starts to count the number of pulse signals outputted from the rotary encoder 21 and outputs a signal representative of the counted number. The counted number corresponds to the number of the pulse signals outputted from the rotary encoder 21 as a function of the position of the rotor magnet 132 with reference to the magnet-pole switching position detected by the Hall sensor 40. Thus, the position of the rotor 13 is determined by counting the number of the pulse signals outputted from the rotary encoder 21. It should be noted that the position detecting section 60 may be arranged to count four times of the number of pulse signals outputted from the rotary encoder 21, thereby increasing the accuracy of position detection, i.e. increasing the resolution of the determination of the position.

Figure 4:
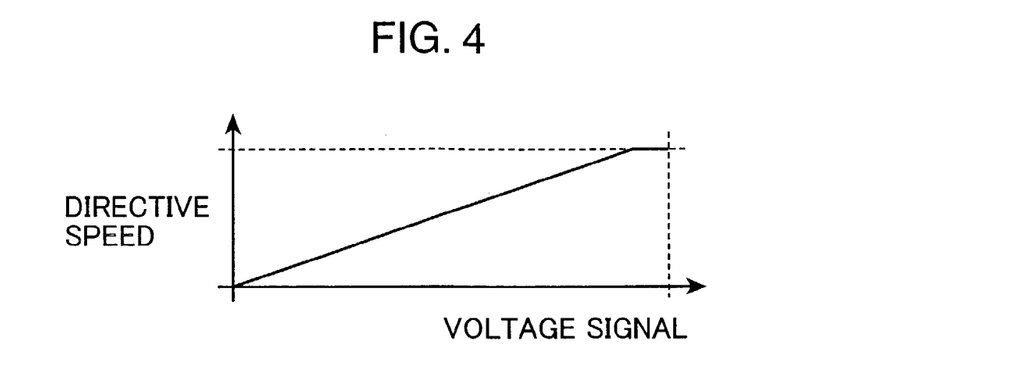
FIG. 4 is a diagram showing relationship between a directive speed and the voltage signal generated in response to the operation to a pedal.

A speed setting section 70 has a ROM which stores data of voltage to be outputted in accordance with the extent of the operation of the pedal 3 and speed values corresponding to the levels or vlaues of the outputted voltage. When the speed setting section 70 receives a voltage signal from the potentiometer interconnected with the pedal 3, the speed setting section 70 reads, from the ROM, a directive speed value corresponding to the received voltage signal. In the present embodiment, the level of the voltage signal linearly increases with the increase of the directive speed value as shown in FIG. 4.

A directive speed judging section 80 receives the signal of the directive speed value from the speed setting section 70 and compares the directive speed value with a predetermined first threshold level and a predetermined second threshold level to generate a motor control signal for making the speed of the motor 30 zero or stopping the motor 30. The predetermined second threshold level is lower than the predetermined first threshold. When the directive speed value is lower than the first threshold level, the directive speed judging section 80 commands an inverter 110 to output a motor control signal which is to make the rotational speed of the turntable 2 zero and lock the motor at stop position. When the directive speed value is lower than the second threshold level, the directive speed judging section 80 commands the inverter 110 to de-energize the coils 122 and allowing the turntable to rotate freely.

As an alternative, the directive speed judging section 80 may be configured to have a single threshold level such that the motor is de-energized to allow the turntable 2 to rotate freely when the directive speed value is lower than the single threshold. In this case, the turntable 2 is made free without being locked before the freeing.

A subtraction section 90 calculates the difference between the directive speed represented by the signal from the potentiometer interconnected with the pedal 3, and the detected speed represented by the signal from the speed detecting section 50, thereby feeding a signal indicative of the difference to a PI control section 100.

The PI (Proportion and Integration) control section 100 includes a proportion section 101 for generating an output signal proportional to the difference signal received from the subtraction section 90 and an integration section 102 for integrating the signal outputted from the proportion section 101, and an addition section 103 for adding the output of the integration section 102 to the output of the proportion section 101. The PI control section 100 increases the gain or control factor of the speed control signal in order to coincide the detected speed with the directive speed.

The inverter 110 includes a memory 1101, three multiplication sections 1102 and three PWM (Pulse Width Modulation) control sections 1103. The memory 1101 stores the amplitude of the sinusoidal wave associated the position of the rotor 13 (counted value) detected by the position detecting section 60. The multiplication sections 1102 respectively multiply the outputs of three phases U, V and W from the memory 1101 by the speed control value outputted from the PI control section 100. The PWM control section 1103 converts respective outputs of the multiplication section 1102 into pulse signals of which widths are function of the output of the multiplication section 1102.

Figure 11:
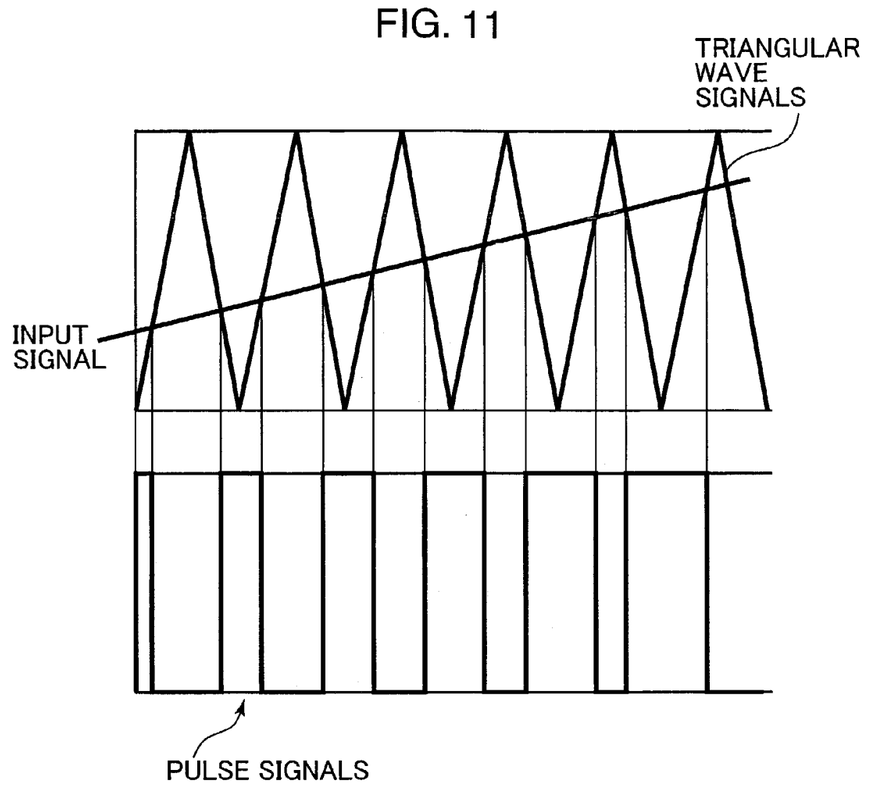
FIG. 11 is a schematic illustration of the conversion of input signal to pulse signals of different widths by the comparison of the input signal with triangular wave signals.
Figure 12:
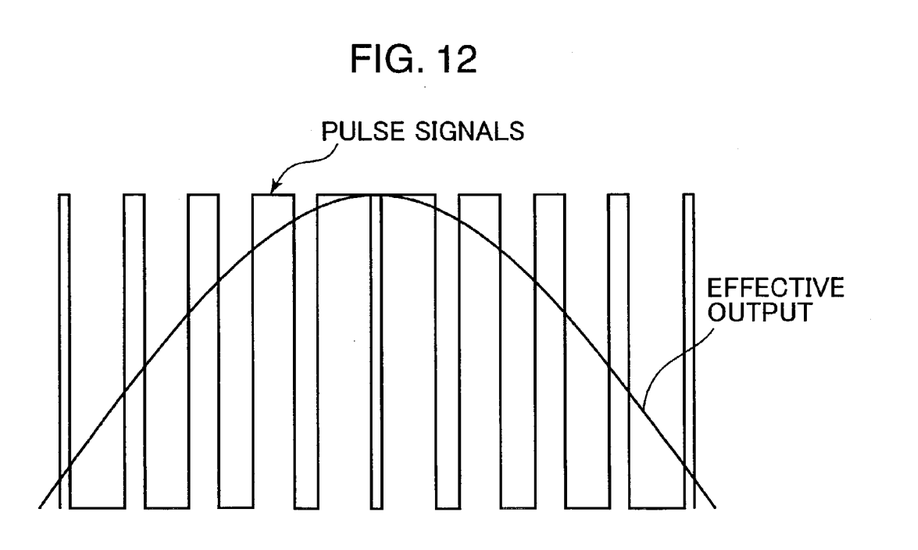
FIG. 12 is a schematic illustration of relationship between change of pulse widths and effective output in the form of sinusoidal wave form.

With reference to FIGS. 11 and 12, the function of PWM will be explained in more detail. FIG. 11 which shows comparison of input signal and triangular wave signal (see the upper portion of the Figure) and converted pulse width (lower portion of the FIG. 11) derived from the comparison. As seen in the upper portion of the FIG. 11, an input signal and a triangular signal are compared with each other and pulse signals shown in the lower portion of the FIG. 11 are produced. In other words, the pulse signals have respective widths corresponding to the time periods while the input signal is higher than the triangular signals.

In the inverter 110, an amplitude of a sinusoidal wave at its electric angle corresponding to the position of the rotor 13 is read out from the memory 1101 and read out data is multiplied by the multiplication section 1102, and then converted to pulse signals by PWM section 1103. While the motor 11 is energized by the pulse signals, the coils of the motor 11 have time constants to smooth the change of electric current supplied to the coil. Thus, the widths of the pulse signals changes in the form of sinusoidal wave as shown in FIG. 12 and the motor 11 is driven by electric current of sinusoidal wave form.

The sinusoidal wave may include higher harmonic wave component. The inverter 110 stops the supply of energizing signal to a driving circuit 120 when it is commanded by the directive speed judging section 80 to stop energization of the coils 122.

The driving circuit 120 is provided with six switches (see FIG. 5) for respectively switching on and off the flow of electric current to the coils of the three phases of the motor 30 respectively in positive and negative directions. The switches energize and de-energize the coils 122U, 122V and 122W of the three phases of the motor 30 to rotate the motor 30 smoothly with a driving form being close to ideal sinusoidal driving.

Figure 5:
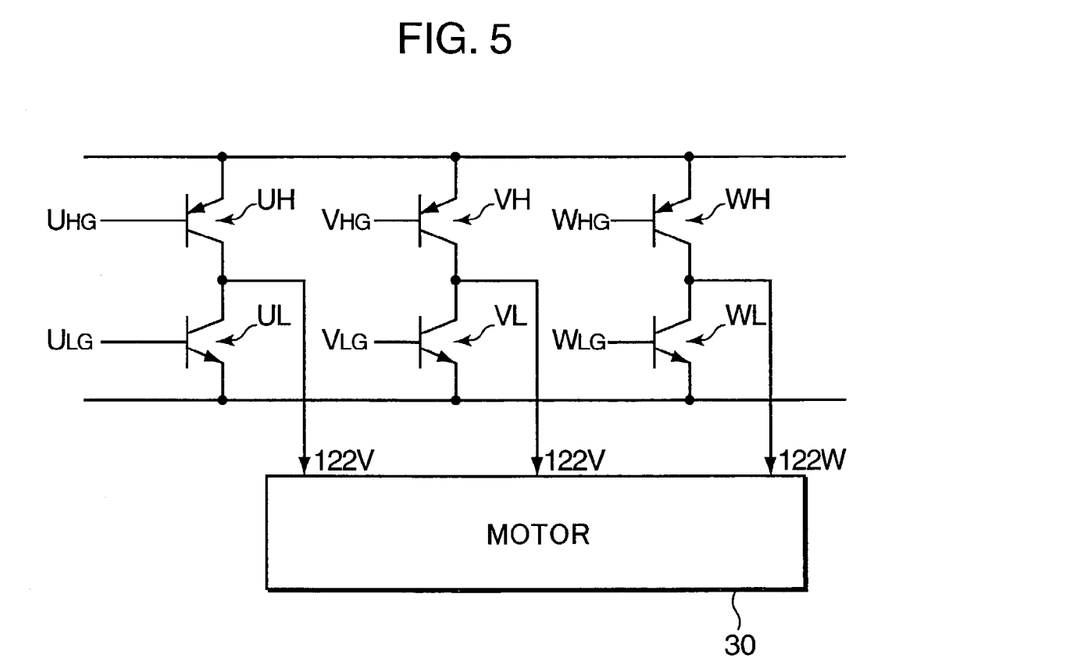
FIG. 5 is a circuit diagram showing in more detail the motor driving circuit shown in FIG. 3.

As shown in FIG. 5, the driving circuit 120 includes switching elements UH and UL for the driving of U phase coil, switching elements VH and VL for the driving of V phase coil and switching elements WH and WL for the driving of W phase coil. The switching elements UH, VH and WH may be, for example, PNP type bipolar-transistors, while the switching elements UL, VL and WL may be, for example, NPN type bipolar-transistors. The energization signals UHG and ULG outputted from the inverter 110 are inputted to the respective bases of the switching elements UH and UL. The energization signals VHG and VLG are inputted to the respective bases of the switching elements VH and VL. The energization signals WHG and WLG are inputted to the respective bases of the switching elements WH and WL. Each of the switching elements UH through WL is turned on upon input of relevant energization signal to its base and supplies a driving signal to corresponding coil 122. The switching elements may be field effect transistors or other types of semiconductor switching elements.

A comparator section 130 is to prevent supply of excessive electric power to the coils 122. The comparator section 130 compares the driving signal outputted from the driving circuit 120 with an upper limit current value stored in an upper limit current memory section 140 to restrict the driving current under the upper limit.

Figure 6B:
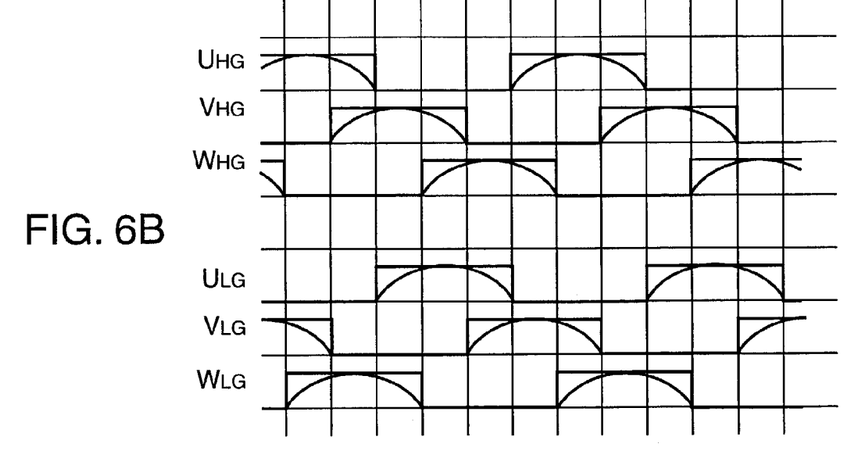

FIGS. 6A and 6B are timing charts for the explanation of the operation of the potter's wheel according to the present embodiment, with the abscissa showing electrical angle with each interval representing 60 degrees. FIG. 6A shows pulse signals HU, HV and HW of U, V and W phases, outputted from the Hall sensors 40. FIG. 6B shows energizing signals UHG, ULG, VHG, VLG, WHG and WLG outputted from the inverter 110. Referring to FIG. 6B, the rectangular lines schematically illustrate, in a simplified form, the pulse signals shown in FIG. 12, while the round curves schematically illustrates the sinusoidal wave signals as the signals in effect.

When the driving of the motor 30 is started and any one of the Hall sensors 40 detects switching of the poles of the rotor magnet 132, one of the pulse signals HU, HV and HW corresponding to the detected magnet is outputted. Receiving the pulse signal from the Hall sensor 40, the position detecting section 60 resets the counter and starts counting of the pulse signals outputted from the rotary encoder 21 and outputs a count signal representative of the counted value corresponding to the position of the rotor 13 and accordingly of the turntable 2. Receiving the count signal, the inverter 110 refers to memory 1101 and read an output value (an amplitude of the sinusoidal wave) corresponding to the counted value represented by the received count signal. The inverter 110, then, multiplies the read output value (the an amplitude of the sinusoidal wave) by the speed control signal outputted from the PI control section 100, and compares the multiplied signal with a triangular wave to produce pulse signals which are outputted by the inverter 110 to the driving circuit 120 as energizing signals. Receiving the energizing signal, the driving circuit 120 turns on relevant switching element to supply driving signal to a relevant coil 122. The driving signal energizes the relevant coil 122 to cause electromagnetic field in the stator 12 which interacts with the magnetic power of the rotor magnet 132 to turn the rotor 13.

As described above, the inverter 110 produces the energizing signal by multiplying the speed control signal by the output of the memory 1101. Accordingly, the inverter 110 generates an energizing signal that makes the rotational speed of the motor 30 higher as the level of the detected speed provided by the speed detecting section 50 is lower in comparison with the level of the directive speed value supplied from the potentiometer interconnected with the pedal 3. Accordingly the motor 30 is controlled to rotate at a directed speed irrespective of the torque and load applied to the motor 30. Consequently, the user or operator need not adjust the amount of the operation to the pedal 3 in accordance with the force applied to the work of wet clay on the turntable 2 to maintain the speed of the turntable constant and enable the user or operator to make the thickness of the work uniform.

In addition, the rotary encoder 21 detects the rotary position of the rotor 13 with a resolution finer than the pitch of the rotor magnet 132, and the inverter 11 outputs an energizing signal of a sinusoidal wave signal having an amplitude corresponding to the detected rotary position with the motor 30 being driven by the energizing signal, whereby the motor 30 rotates smoothly.

Further, the PI control section 100 increases the gain or control factor of the error detection signal so that the rotational speed of the turntable 2 is more accurately matched with the directed speed.

Still further, the embodiment described above, employs an inner rotor type motor as the driving motor so that the value of $GD^2$ is small to improve the response of the motor 30. $GD^2$ value is known as a value showing flywheel effect and corresponds to inertia.

In the embodiment described above, the driving of the motor 30 is controlled by current loop system wherein output current from the driving circuit 120 is compared with the upper limit current value stored in the upper limit current memory section 140 and the result of the comparison is fed back to the driving circuit 120. This system requires a converter circuit for converting the current derived from the driving circuit 120, to a voltage of the level to be treated by the control circuit, resulting in increase of cost of the total system.

Instead of deriving the current from the wirings to the motor, an electric current may be derived from the driving circuit 130 and inputted to the comparison circuit 130 of which output, in turn, fed back to the driving circuit 120. In this case, the current is somewhat roughly controlled but is practically effective and may save the cost. However, this rough control may have some problem. When the load to the motor 11 increases, during the throwing operation, to enter the region B shown in FIG. 9, abnormal noise occurs and output torque of the motor 11 becomes unstable. This is because PWM control is effective in the region A to maintain the rotational speed of the motor 11 irrespective of increase of load, but when the load to the motor 11 is so large to be in the region B, the clipper circuit operates asynchronously with the carrier frequency of the chopper circuit.

To cope with this problem, according to a second embodiment of the present invention, a limiter is provided between the PI control section 100 and the inverter 110 to determine whether or not the output voltage of the PI control section 100 is higher than a predetermined limit value, and output the output voltage in the form as it is, to the inverter 110 when the output voltage is not higher than the limit value, but output a voltage corresponding to the limit value when the output voltage is higher than the limit value. Accordingly, the duty cycle, i.e. the pulse width of the PWM is limited to a predetermined upper limit value. As the result, the motor 11 automatically decreases its rotational speed along the line c shown in FIG. 10 with the motor maintaining the relationship between the rotational speed and the load torque that can be produced with that pulse width. In this way, the rotational speed of the motor slows down before reaching the region B where noise occurs. Then, the user or operator recognize in advance from the slowing down of the motor that he or she applied too much load to the work and accordingly to the motor.

Figure 10:
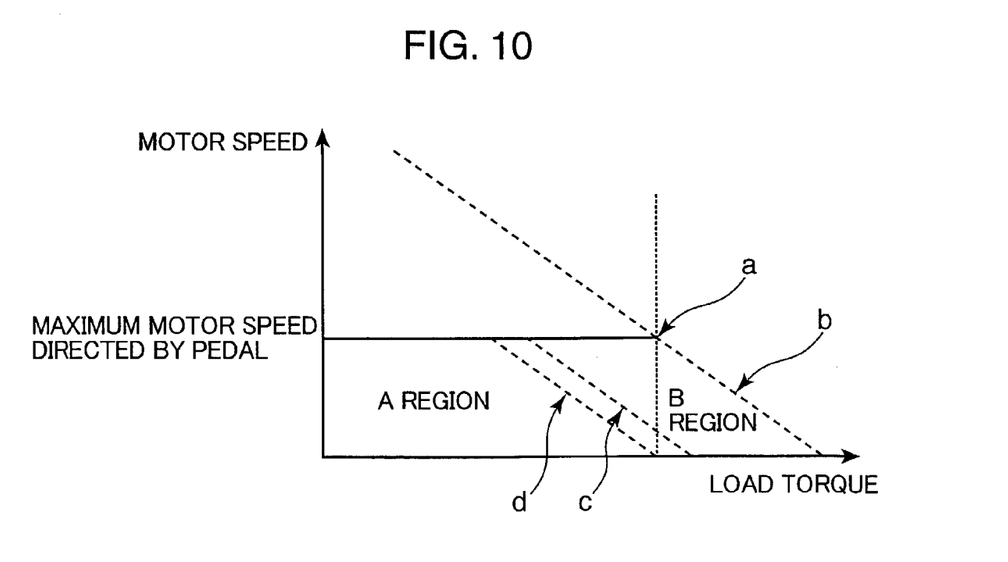
FIG. 10 is a diagram showing the relationship between the load applied to a motor and rotational speed of the motor.

In addition, as compared with the case where no limiter is provided and the torque of the motor becomes unstable suddenly when the load characteristics reaches the point a in FIG. 10, i.e. the point of rated torque, the present embodiment provide comfortable operation feeling with the motor decelerating gradually until it loses the torque. If the limit voltage is set lower than the upper limit value to make the rotational speed of the motor decreases along the line d in FIG. 10, the motor operation will not enter the abnormal noise occurring region B.

Figure 9:
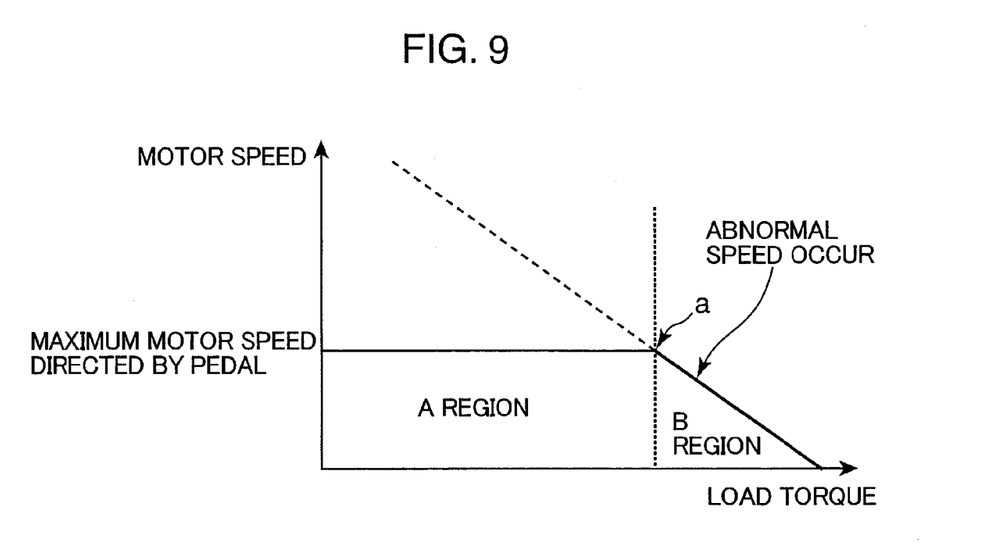
FIG. 9 is a diagram showing the relationship between the load applied to a motor and rotational speed of the motor.

FIGS. 9 and 10 show the relationship between the rotational speed of the motor and load torque applied to the motor. FIG. 9 shows the case where the limiter is not provided in the rough control of motor driving. When the load increases with the rotational speed of the motor being maintained constant, the current consumed by the motor increases. The rotational speed can be maintained up to a certain value of the load, but abnormal noise occurs and rotation of the motor becomes unstable and decreases when the load exceeds the point a in FIG. 9. FIG. 10 shows the motor rotation and load characteristics according to the embodiments of the present invention where countermeasures are taken against such abnormal noise.

The present invention may take various forms and modification such as:

The motor may not necessarily be a direct drive motor but may be any of other types of DC brushless motors.

The motor may not necessarily be inner rotor type motor but may be outer rotor type of direct drive motor.

In the embodiment described above, the speed control signal is produced by the subtraction section 90 and PI control section 100. As a modification, a PLL (phase lock loop) circuit may be employed in lieu of the subtraction section 90 and PI control section 100. When PLL circuit is employed for the control of the speed control signal, stability of the motor speed is further improved so that fluctuation or unevenness of the motor rotation is reduced to facilitate throwing of a large dish or a plate which requires slow rotation of the turn table.

In the above embodiment, the speed detecting section 50 produces the detected speed signal from the pulse signals outputted from the rotary encoder 21. The speed signal may be produced from pulse signals outputted from the Hall sensor 40.

The inverter 110 may output other type of pulse signals than the sinusoidal wave signals as in the embodiment described above.

The PI control section 100 may composed of either the proportion section 101 or integration section 102 instead of being composed of both the proportion section 101 and the integration section 102 as in the above embodiment. Further, differentiation section may be added to both the proportion section 101 and the integration section 102 to produce the speed control signals by PID (Proportion, Integration and Differentiation) control.

Figure 7:
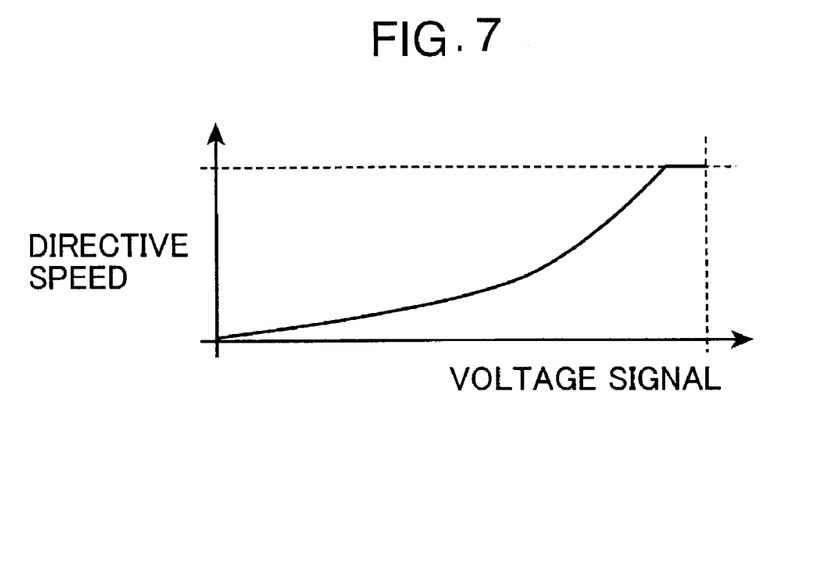
FIG. 7 is a diagram showing the relationship between the directive speed and the voltage signal generated in response to the operation to a pedal.

In the embodiment described above, the speed setting section 70 produces directive speed value with a characteristics linearly increasing with the increase of the level of the voltage signal outputted from the potentiometer linked with the pedal 3. Instead thereof, the directive speed signal may be produced to show a characteristics (see FIG. 7) that increases exponentially with the increase of the level of the voltage signal outputted from the potentiometer linked with the pedal 3. With this output speed characteristics, the rotational speed of the turntable increases gradually in low speed range used by the operator frequently, and increases rapidly in high speed range used for finishing the work.

Figure 8:
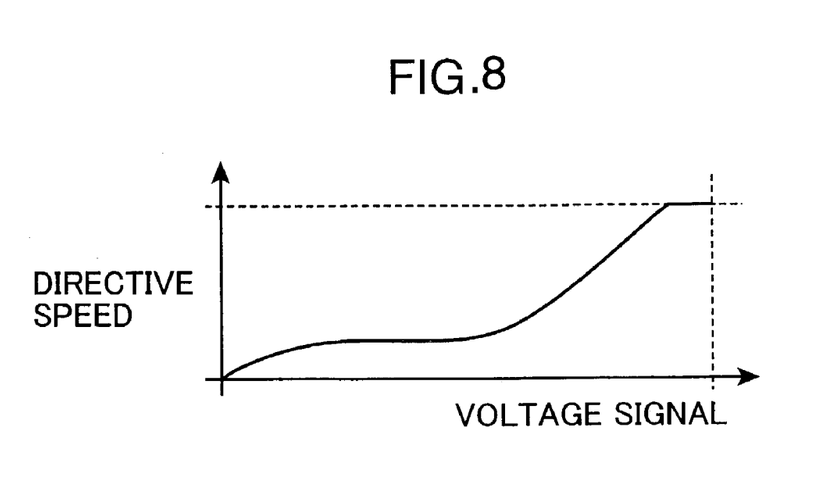
FIG. 8 is a diagram showing the relationship between the directive speed and the voltage signal generated in response to the operation to a pedal.

Still further, the directive speed signal may be changed in another characteristics (see FIG. 8) that increases gradually along a gentle curve in a low speed regions that is substantially flat in the middle speed region and that increase linearly in a high speed region. With such speed control characteristics, the speed of rotation of the turntable raises gently at low speed region to enable the operator to control the rotational speed delicately. In the middle region, the rotational speed does not show substantial change. The speed at the middle range may be set at a favorite value which the operator often and usually use for the pottery. Thus, the rotational speed does not change in that region even if the user operates the speed control pedal a little. In the high speed range, the rotational speed increases in proportion to the amount of the operation to the pedal. It is to be understood here that the characteristic in the high speed range must not necessarily be linear in the strict sense, i.e. such as expressed by straight line, but may be somewhat curved or fluctuated so long as the speed increases as the pedal is moved further. The term "substantially linear" may include those cases.

In this way, the operational feeling of the user or operator matches the relationship between the amount of pressing-down of the pedal and the rotational speed of the turntable 2 responsive to the pedal operation, resulting in improvement in the operational property of the potter's wheel.

As a further modification, the potter's wheel may be arranged such that the various types of the pedal operation responsive speed control characteristics are provided to be selected by the user or operator optionally.

Although the embodiment has been described in the above as being composed of hard-wares to be shown by a block diagram, the present invention may be carried out by a soft ware that attains the same functions as those of the embodiment.

This application is based on patent application Nos. 2002-238671 and 2002-318537 filed in Japan, the contents of which are hereby incorporated by references.

Having described our invention as related to embodiment shown in the accompanying drawings, it is our intention that the invention be not limited by any of the details of description, unless otherwise specified, but rather be construed broadly within its spirit and scope as set out in the accompanying claims.

What is claimed is:

1. A potter's wheel for working pottery material, comprising:
   a turntable for supporting the pottery material;
   a motor for driving the turntable;
   a manipulation member to be operated by a user;
   a speed signal producer for producing a directive speed signal which changes as a function of an amount of operation of the manipulation member by the user;
   a speed detector for detecting the rotational speed of the motor and generating a detected speed signal representative of the detected speed;
   a speed control signal producer for producing a motor speed control signal as a function of the difference between the directive speed signal and the detected speed signal; and
   a motor controller for generating a motor drive signal and feeding the motor drive signal to the motor, the motor controller being capable of controlling the motor drive signal so that the speed control signal becomes zero, wherein the motor controller includes a driving circuit for generating a motor driving current to be fed to the motor, a current detector for detecting the current fed to the motor, an upper limit memory section for storing an allowable upper limit value of the electric current, a comparator for comparing the detected current with the upper limit value stored in the upper limit memory section, and a feedback circuit for feeding back the output of the comparator to the driving circuit to control the motor driving current outputted from the driving circuit.

2. A potter's wheel according to claim 1, wherein the motor is a DC brushless motor including a stator and a multi-pole rotor magnet opposing the stator.

3. A potter's wheel according to claim 2, wherein the motor includes a rotor which supports the rotor magnet, and the rotor is arranged inside of the stator.

4. A potter's wheel according to claim 1, wherein the speed control signal producer includes a proportion control for outputting a signal proportional to the difference between the directive speed signal and the detected speed signal.

5. A potter's wheel according to claim 4, wherein the speed control signal producer further includes an integration control for integrating the output of the proportion control, and an adding unit for adding the output of the integration control to the proportion control.

6. A potter's wheel according to claim 5, wherein the speed control signal producer further includes a differential control.

7. A potter's wheel according to claim 1, wherein the speed control signal producer includes an integration control for outputting a signal as an integration of the difference between the directive speed signal and the detected speed signal.

8. A potter's wheel according to claim 1, wherein the speed signal producer is operative for producing the directive speed signal so that the directive speed signal changes in non-linear relationship, in a low speed range, with the amount of the operation of the manipulation member.

9. A potter's wheel according to claim 1, wherein the speed signal producer is operative for producing the directive speed signal so that the directive speed signal increases gradually along a gentle curve in a low speed region, and increases substantially linearly in a high speed region.

10. A potter's wheel according to claim 8, wherein the speed signal producer is capable of producing the directive speed signal with a plurality of characteristics with respect to the change in speed signals with the amount of the operation of the manipulation member, and further comprising a selector for selecting the characteristics.

11. A potter's wheel according to claim 1, wherein the speed control signal producer includes a PLL circuit for producing the speed control signal in accordance with a comparison of phases of the detected speed signal and the directive speed signal.

12. A potter's wheel for working pottery material, comprising:
   a turntable for supporting the pottery material:
   a motor for driving the turntable:
   a manipulation member to be operated by a user:
   a speed signal producer for producing a directive speed signal which changes as a function of an amount of operation of the manipulation member by the user:
   a speed detector for detecting the rotational speed of the motor and generating a detected speed signal representative of the detected speed:
   a speed control signal producer for producing a motor speed control signal as a function of the difference between the directive speed signal and the detected speed signal; and
   a motor controller for generating a motor drive signal and feeding the motor drive signal to the motor, the motor controller being capable of controlling the motor drive signal so that the speed control signal becomes zero, wherein the motor controller includes a driving circuit for generating a motor driving current to be fed to the motor, a pulse generator for generating pulse signals for driving the motor, a pulse width controller for controlling the width of the pulse signals, an upper limit memory section for storing an allowable upper limit value of the electric current, a comparator for comparing the detected current with the upper limit value stored in the upper limit memory section, a limiter provided between the pulse width controller and the pulse generator to detect whether the voltage at the pulse signal generator is larger than a predetermined value, and a signal passage controller for allowing passage of the pulse signals as they are when the voltage is not larger than the predetermined value and feeding a signal corresponding to the predetermined value when the voltage is larger than the predetermined value.

13. A potter's wheel according to claim 1, wherein the speed signal producer comprises a potentiometer that produces an electric output as the directive speed signal, the potter's wheel further comprising an amplifier provided between the manipulation member and the potentiometer for amplifying changes of the electric output with respect to the amount of operation to the manipulation member.

14. A potter's wheel according to claim 1, further comprising a directive speed judging unit for judging whether the directive speed is lower than a first threshold level and a second threshold level which is lower than the first threshold level, and wherein said motor controller includes a motor stop controller which is interrelated with the directing speed judging unit such that the motor is locked at zero speed of rotation when the directive speed is lower than the first threshold level but higher than the second threshold level, and that the motor is de-energized to allow the turntable to turn freely when the directive speed is lower than the second threshold level.

15. A potter's wheel according to claim 1, further comprising a directive speed judging unit for judging whether the directive speed is lower than a single threshold level, and wherein said a motor controller includes a motor de-energization controller which is interrelated with the directing speed judging unit such that the motor is de-energized to allow the turntable to turn freely when the directive speed is lower than the single threshold level.

* * * * *